(12) United States Patent
McKnight et al.

(10) Patent No.: US 6,723,401 B1
(45) Date of Patent: Apr. 20, 2004

(54) VIBRATION DAMPING MEMBER AND METHOD OF MAKING SAME

(75) Inventors: Robert T. McKnight, Downsville, MD (US); Clifford A. Metger, Hagerstown, MD (US); Kent Wilson, Woodbury, MN (US)

(73) Assignee: Ergodyne Corporation, St. Paul, MN (US)

( * ) Notice: Subject to any disclaimer, the term of this patent is extended or adjusted under 35 U.S.C. 154(b) by 44 days.

(21) Appl. No.: 09/648,507

(22) Filed: Aug. 25, 2000

Related U.S. Application Data
(60) Provisional application No. 60/150,624, filed on Aug. 25, 1999.

(51) Int. Cl.[7] .............................. B32B 1/02; A61B 19/04
(52) U.S. Cl. .................... 428/35.7; 428/36.8; 428/213; 428/424.8; 2/161.1; 2/161.2; 2/161.3; 2/161.4; 2/161.5; 2/161.6; 2/16; 2/20; 2/21
(58) Field of Search ................. 428/36.8, 213, 428/424.8; 2/161.1–161.6, 16, 20, 21

(56) References Cited

U.S. PATENT DOCUMENTS

| | | | | |
|---|---|---|---|---|
| 4,101,704 A | | 7/1978 | Hiles ........................... 428/218 |
| 4,346,205 A | | 8/1982 | Hiles ........................... 528/53 |
| 4,777,739 A | | 10/1988 | Hiles ........................... 36/43 |
| 4,808,469 A | * | 2/1989 | Hiles ........................ 428/318.6 |
| 4,867,271 A | | 9/1989 | Tschudin-Mahrer ......... 181/290 |
| 4,980,386 A | | 12/1990 | Tiao et al. ................... 521/108 |
| 5,121,962 A | | 6/1992 | Weber et al. ................ 297/214 |
| 5,159,717 A | | 11/1992 | Drew et al. ..................... 2/20 |
| 5,274,846 A | | 1/1994 | Kolsky ............................. 2/2 |
| 5,285,529 A | | 2/1994 | Arena ............................. 2/20 |
| 5,345,609 A | | 9/1994 | Fabry et al. ..................... 2/20 |
| 5,632,045 A | * | 5/1997 | Chase et al. ................. 2/161.6 |
| 5,673,437 A | * | 10/1997 | Chase et al. ................... 2/167 |
| 5,822,795 A | | 10/1998 | Gold ............................. 2/159 |
| 5,911,313 A | | 6/1999 | Gold ............................. 2/159 |
| 5,987,705 A | | 11/1999 | Reynolds ..................... 16/431 |
| 6,025,067 A | * | 2/2000 | Fay .......................... 428/314.4 |
| 6,052,827 A | | 4/2000 | Widdemer ................... 2/161.1 |
| 6,055,671 A | | 5/2000 | Fung-Ming ................... 2/167 |
| 6,101,628 A | | 8/2000 | Earl ............................... 2/21 |

FOREIGN PATENT DOCUMENTS

| | | |
|---|---|---|
| FR | 2 375 686 | 7/1978 |
| FR | 2 643 431 | 8/1990 |
| FR | 2 731 592 | 9/1996 |
| WO | WO 97/27770 | 8/1997 |

OTHER PUBLICATIONS

European Search Report dated Dec. 29, 2000.

* cited by examiner

*Primary Examiner*—Harold Pyon
*Assistant Examiner*—Marc Patterson
(74) *Attorney, Agent, or Firm*—Patterson, Thuente, Skaar & Christensen, P.A.

(57) ABSTRACT

A laminate article for damping mechanical vibrations. One embodiment of the damping article includes a neoprene layer, a foamed polyurethane middle layer, and a nonfoamed polyurethane layer. The layers are preferably adhered in an overlaying relation. The article reduces at least 40% of high frequency mechanical vibrations (200 Hz–1250 Hz) otherwise transmitted to the wearer.

38 Claims, 6 Drawing Sheets

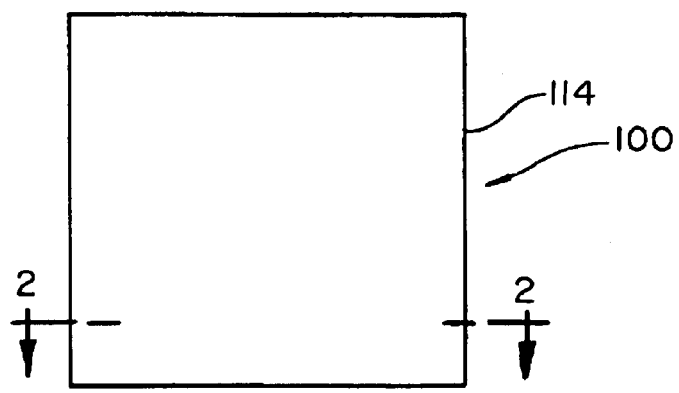
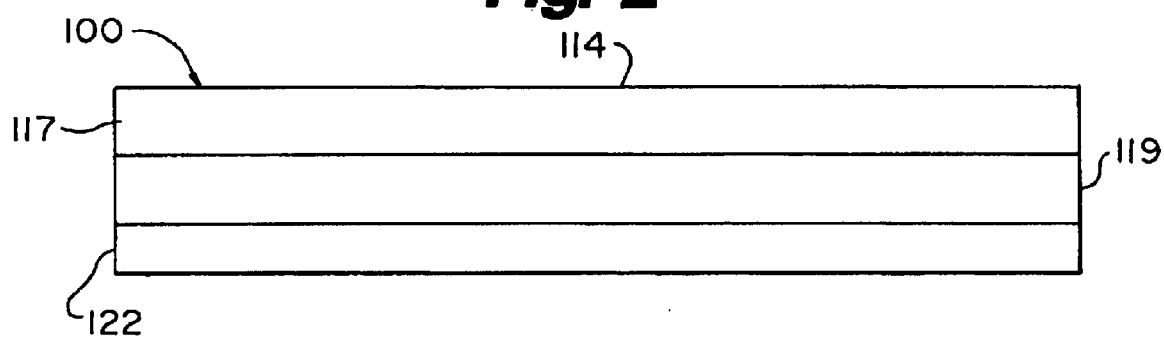

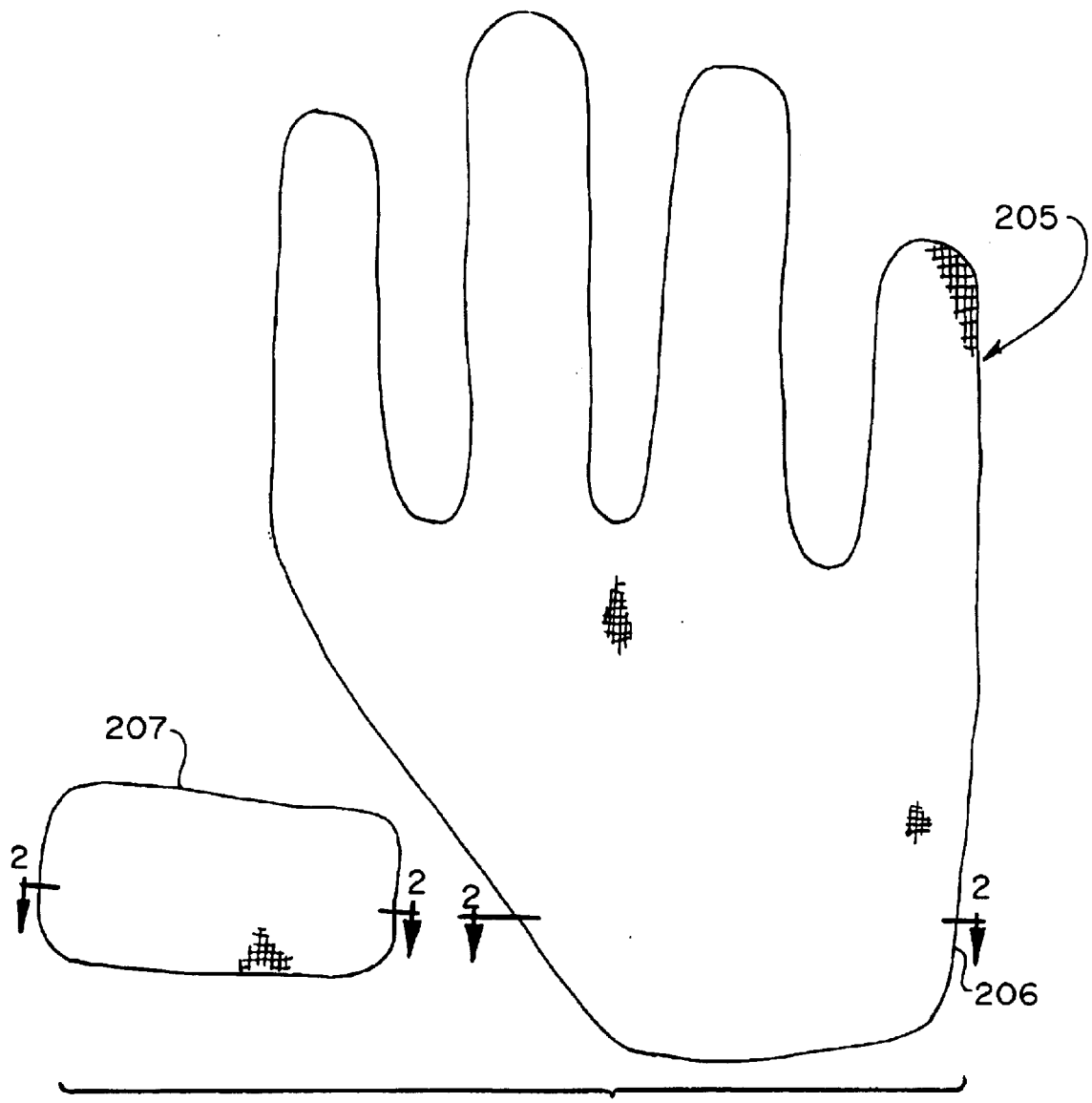

VIBRATION DAMPING MEMBER AND METHOD OF MAKING SAME

CROSS-REFERENCES TO RELATED APPLICATIONS

This application claims priority under 35 U.S.C. §119(e) to, and hereby incorporates by reference, U.S. Provisional Application No. 60/150,624, filed Aug. 25. 1999.

BACKGROUND OF THE INVENTION

1. Field of the Invention

This invention relates to a vibration-damping article and, more particularly, this invention relates to an article effective in reducing injuries caused by exposure to mechanical vibrations.

2. Background of the Invention

Tools which generate mechanical vibrations are ubiquitous in many work places. These tools include those directly powered by electricity and those which are hydraulically powered, e.g., by compressed air. Tools of this nature include grinders, drills, jackhammers, riveting guns, impact wrenches, chain saws, powered hammers, chisels, sanders, breakers, compactors, sharpeners, and shapers. When being used, these tools generate and transmit mechanical vibrations to the user's hands. These mechanical vibrations may be classified by frequency. Those mechanical vibrations with frequencies of less than about 31.5 Hz are considered to be in the low (L) range. Mechanical vibrations with frequencies between about 31.5 Hz and 200 Hz may be considered to be in a medium or middle (M) frequency range. Mechanical vibrations with frequencies between about 200 Hz and 1250 Hz may be considered to be within the high (H) range.

Prolonged exposure by persons using, vibration-generating tools is considered to be a causal agent of Hand/Arm Vibration Syndrome (HAVS), also known as "white-finger disease." HAVS is caused by prolonged exposure to mechanical vibrations and may be further exacerbated by working conditions in which colder temperatures are present. HAVS may result from exposure times ranging from one month to 30 years, or more, depending upon the intensity of the vibration source, the transmissibility and absorption of vibrations by the user, and the susceptibility of the individual to this disorder. Peripheral, vascular and neural disorders of the fingers and hands are characteristic of HAVS. Symptoms include numbness, pain, blanching of the fingers, loss of finger dexterity, and discomfort and pain in the worker's upper limbs. HAVS can damage blood vessels, thereby reducing the blood supply to the user's extremities. HAVS can also damage nerves in the user's hands and fingers, thereby causing a permanent loss of feeling. Moreover, the user's bones and muscles may become damaged as well. Consequences of HAVS may include loss of flexibility, the ability to grip or grasp objects, and, in extreme cases, gangrene. Because HAVS cannot be cured, prevention should be a major emphasis in the work place. Preventative measures, such as tools and articles of apparel designed to reduce the amount of vibrational exposure, should be utilized.

A substantial amount of frequency vibration is transmitted from power tools to the hands and upper extremities of workers. Workers who must stand on platforms may also be exposed to these deleterious vibrations. Efforts to mitigate, or attenuate, this unacceptable vibrational energy transmission have included using gloves with various protective materials. Examples of some of these efforts to manufacture and design gloves to attenuate vibrational exposure include those described in U.S. Pat. Nos. 5,632,045, 5,673,437, 5,822,795, and 5,987,705, the entire disclosures of each hereby incorporated by reference. Mitigation and vibration reduction to other parts of the body, e.g., the foot, has been disclosed in U.S. Pat. No. 4,627,179, the disclosure also hereby incorporated by reference.

In order to be safely and effectively used, tools must be easily and firmly grasped by the worker. To be safely and firmly grasped by the worker, handles and other surfaces grasped or gripped during use should have a cross-sectional dimension (e.g., a diameter) within a specified range. If gloves are worn, the cross-sectional dimension should be smaller to accommodate the thicknesses of the gloves. Thus, gloves and other shielding devices failing to provide an effective gripping diameter of between about 1.0 and 2.0 inches (e.g., 1.5 inch) may cause excessive and premature hand fatigue, thereby reducing the ability of the worker to effectively and efficiently control the tool being used.

Previously, gloves which protect wearers from vibration-induced injury have often limited the dexterity, e.g., the ability to pick up and manipulate objects, of persons wearing the glove.

Therefore, there is a need for a damping article which will damp otherwise harmful mechanical vibrations sufficiently to prevent the onset of HAVS, yet will provide for a grip which will enable a worker to effectively control the tool being used to prevent or greatly delay the onset of gripping fatigue and will provide for an enhanced dexterity.

SUMMARY OF THE INVENTION

This invention substantially meets the aforementioned needs of the industry by providing a substantially flexible article for damping mechanical vibrations. The article may include first, second, and third layers. The first layer may include a polymer capable of damping at least a portion of the middle range of mechanical vibrational frequencies such as neoprene. The second layer may include a viscoelastic polymer capable of damping at least a portion of the high range of mechanical vibrational frequencies such as a foamed polyurethane. The third layer may include a second viscoelastic polymer capable of damping at least a portion of the middle range of mechanical vibrational frequencies such as a non-foamed polyurethane. The first, second, and third layers may be disposed in a substantially overlaying relation. The article may be characterized by a medium range vibratory transmissibility of less than about 1.0, and a high range vibratory transmissibility of less than about 0.6.

It is an object of the present invention to provide an article which will damp mechanical vibrations so that injury to persons exposed to these vibrations is greatly or significantly reduced.

It is another object of the present invention to provide a vibration damping article which is dimensioned and configured to be inserted into a glove.

It is yet another object of the present invention to provide a vibration damping article which can be permanently provided in a glove.

It is still another object of the present invention to provide a vibration damping article with an article thickness dimensioned to provide an effective gripping cross sectional dimension to prevent or greatly reduce gripping fatigue.

It is a further object of the present invention to provide a vibration damping article with a reduced article thickness to enhance the dexterity and flexibility of a user's hands when the present article is present in protective gloves.

It is yet still another object of this invention to provide a vibration damping article which will eliminate or greatly reduce the exposure of a wearer's feet to injury by mechanical vibrations.

These and other objects, features, and advantages of this invention will become apparent from the description which follows, when considered in view of the accompanying drawings.

BRIEF DESCRIPTION OF THE DRAWINGS

FIG. 1 is a plan view of a first embodiment of the present vibration damping article;

FIG. 2 is a cross-sectional view of the embodiment of FIGS. 1, 3–6, and 10 along line 2—2;

FIG. 3b is a plan view of a third embodiment of the present vibration damping article;

DETAILED DESCRIPTION OF THE DRAWINGS

Figure 3A:
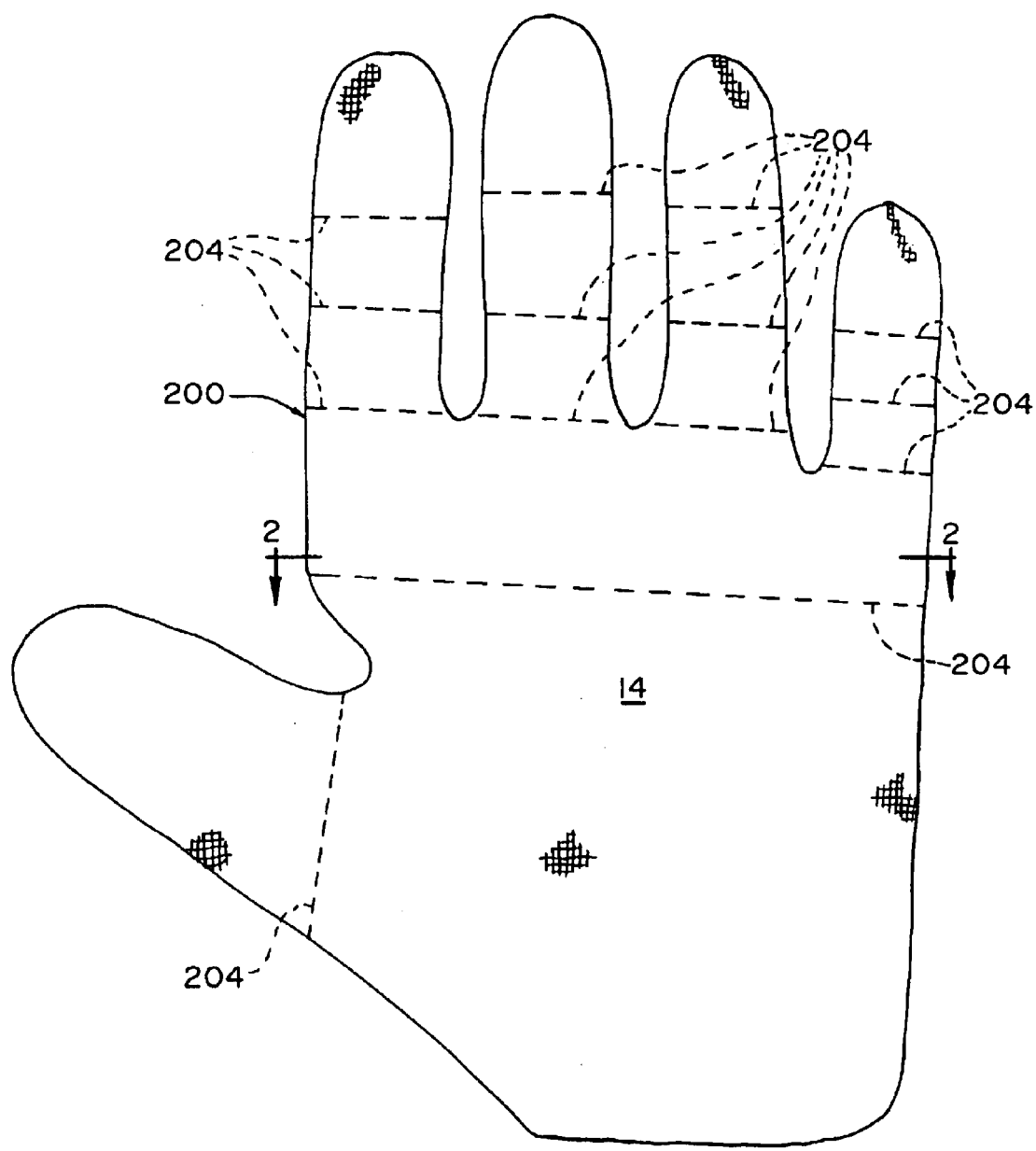
FIG. 3a is a plan view of a second embodiment of the present vibration damping article.

A first embodiment of the present damping article is depicted in FIG. 1, generally at 100, and includes a damping material 114. Referring to FIG. 2, the damping material 114 includes layers 117, 119, and 122, each layer with a synthetic resin. The synthetic resin of layer 117 is effective in damping at least some of the mechanical vibrational frequencies in the M frequency range (31.5 Hz–200 Hz). The synthetic resin in layer 119 is effective in damping at least some of the mechanical vibrational frequencies in the H range (200 Hz–1250 Hz), and the synthetic resin of layer 122 is effective in damping at least some of the mechanical frequencies within the M frequency range. In one embodiment, the synthetic resin of layer 117 is a closed cell, poly(2-chloro-1,3-butadiene) also known as neoprene. One suitable example of this synthetic resin is marketed by the RUBA-TEX Corporation, Roanoke, Va., as R-1400-N. The layer 117 may have a thickness of between about 0.0625" and 0.1875", between about 0.10"and 0.15", or any range subsumed therein, or about 0.125". As determined by ASTM protocols, the synthetic resin of the layer 117 may have a compression deflection of between about 2 psi and 5 psi, or any range subsumed therein, an average density of between about 8 and 15 pounds per cubic foot, or any range subsumed therein, and a maximum water absorption of about 5%. The synthetic resin of the layer 117 may further be characterized by a Shore 00 durometer of between about 28 and 45, or any durometer range subsumed therein.

The synthetic resins of layers 119 and 122 may include formulations of a viscoelastic polymer. The viscoelastic polymer of layer 119 may be foamed, or otherwise include air pockets (cells), such that the polymer of the layer 119 may be characterized by a density of between 90% and 95%, or any density range subsumed therein, or about 95% of the density of the polymer of the layer 122. The polymer of the layer 119 may further have a weight of between about 8.00 and 8.16 pounds per gallon or about 8.08 pounds per gallon. The layer 119 may have a thickness of between about 0.060" and 0.066", between about 0.061" and 0.066", any range subsumed therein, or about 0.060" in thickness. The synthetic resin of the layer 119 may further be characterized by a Shore 00 hardness value of between about 21 and 27, between about 23 and 25, or any range subsumed therein.

The synthetic resin of the layer 122 may be substantially identical to the synthetic layer of the layer 119, except that air pockets are substantially absent therefrom and may be further characterized by a Shore 00 hardness value of between 28 and 34, between 30 and 32 or any range subsumed therein. The thickness of the layer 122 may be between about 0.50" and 0.59", between about 0.52" and 0.59", or any range subsumed therein, about 0.50", about 0.52", about 0.55", or about 0.59". Without wishing to be bound by any specific theory, the synthetic resin of the layer 119 is thought to contribute to damping at least some mechanical vibrational frequencies within the H range and the synthetic resin of the layer 122 is considered to be useful in damping at least some mechanical vibrational frequencies within the M range. Suitable synthetic formulations for the layers 119 and 122 are polyurethanes marketed as AKTON by Action Products, Incorporated, Hagerstown, Md. Again, while not desiring to be bound by any specific theory, the article 100 is considered to be effective in damping mechanical vibrations when the layer 117 is disposed nearest the wearer and the layer 122 is disposed toward the source of the mechanical vibrations.

Figure 4:
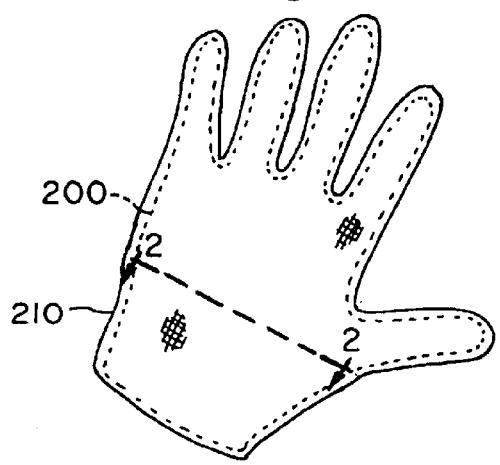
FIG. 4 is a plan view of the damping article of FIG. 3a disposed in a glove.

Referring to FIG. 3a, the present damping article may be configured as a glove insert 200. The glove insert 200 may be inserted in a glove 210 in the manner depicted in FIG. 4. In FIG. 4, the article 200 is depicted in phantom. Alternatively, the article 200 may be permanently installed within the glove 210. If so, the layer 122 may be disposed proximate the shell of the glove 210 and the layer 117 may be disposed proximate an inner glove liner (not shown). The article 200 may be fixed in place in the glove 210 between the glove liner and the glove shell by stitching, or other methods known to the art. Optional crease lines 204 are depicted in phantom. The crease lines 204 are contemplated to include structure which enhances the dexterity and/or flexibility of the wearer's hands, e.g., make bending, flexing, grasping, and picking up objects easier. In this embodiment, the crease lines represent portions of diminished thickness coinciding with bending portions of the user's hand, e.g., adjacent the knuckles, thumb base, palm interior. Alternatively, the article 200 could be severed along the crease lines to enhance flexibility. The severed pieces would be especially desirable in situations where the severed pieces were secured (e.g., stitched) into a glove.

FIG. 3b depicts an alternative to the embodiment of FIG. 3a at 205. Article 205 includes a first (main) portion 206 and a second (thumb) portion 207. The separated portions 206 and 207 enable a greater degree of user flexibility, e.g., for enhancing the ability to grasp objects. The second portion 207 may substantially wrap around the user's thumb, rather than fitting lengthwise thereto. Obviously, the portions of the first portion corresponding to the user's digits could also be separated from the first portion corresponding to the user's palm. Moreover, the portions corresponding to the user's digits and palm could be separated further along lines of bending, e.g., knuckles.

Figure 5:
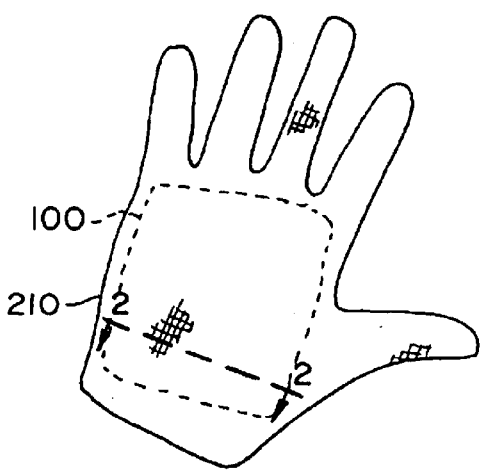
FIG. 5 is a plan view of the damping article of FIG. 1 disposed in a glove.
Figure 6:
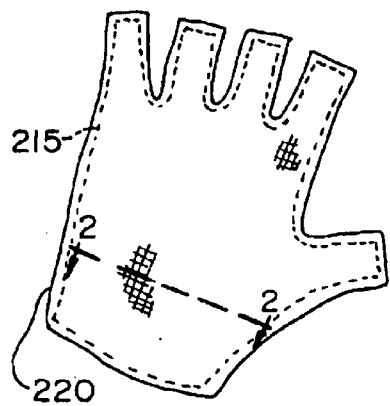
FIG. 6 is a plan view of a fourth embodiment of the present damping article disposed in a glove.

In situations where it is either not necessary or not desired that the user's fingers be protected by the present article, a configuration such as article 100 may be used in cooperation with the glove 210. The article 100, as depicted in phantom in FIG. 5, protects the palm portion of the user's hand. The article 100 may be reversibly placed inside the glove 210 or permanently installed as a part of the glove as described above. Referring to FIG. 6, the present article may be configured as depicted in phantom generally at 215. With respect to the article 215, the palm portion and portions of the digits proximate the palm portion are protected by the present article and the more distal portions of the digits (e.g., finger and thumb tips) are not protected. The article 215 may be reversibly installed within the glove 220 or may be permanently affixed therein as described above.

Figure 7:
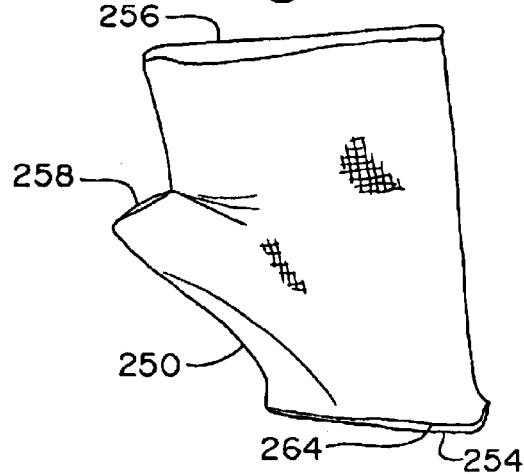
FIG. 7 is a plan view of a fifth embodiment of the present damping article.

In contrast to the embodiments depicted in FIGS. 1 and 3a–6, an article 250 of the present invention encompassing an entire portion of the user's hand when donned is depicted in FIG. 7. This embodiment displays openings 254, 256 and 258, which provide access to a cavity 264. The user dons the article 250 by inserting the user's hand into cavity 264 via opening 254. When the article 250 is donned, the user's thumb extends from opening 258 and all, or portions, of the user's fingers extend from opening 256. The embodiment 250 may be worn by a user by itself or may be worn inside a glove as desired.

An effective (ergonomic) gripping diameter is considered to be a cross-sectional dimension of an article that will enable an ordinary user to grasp and control the article with this diameter without encountering premature hand fatigue. The thickness of any intervening material, such as a glove, and the present damping article, between the user's hand and the article to be gripped would be included in defining the gripping diameter. An effective gripping diameter may be between about 1" and 2", between about 1.25" and 1.75", or any range subsumed therein, or about 1.5". It has been determined that thicknesses of the present damping article may be between about 0.2" and 0.275", between about 0.22" and 0.275", between about 0.22" and 0.25", between about 0.238" and 0.237", between about 0.238" and 0.25", or any range subsumed therein. However, article thicknesses greater than those described may be desirable under certain conditions and are considered to be within the scope of this invention as well.

Figure 8:
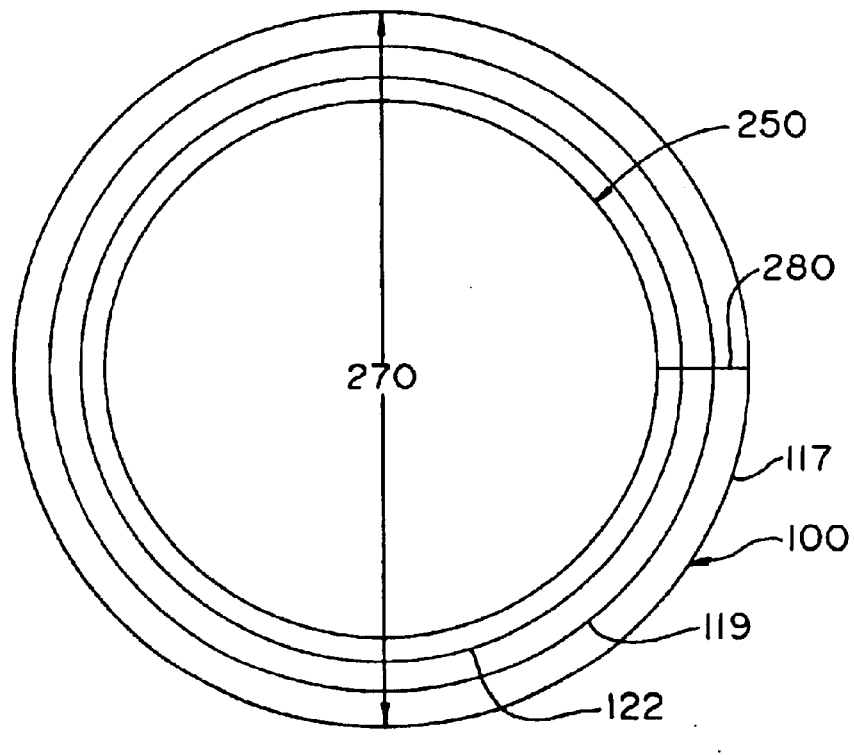
FIG. 8 is a cross-sectional view of the first embodiment of the present damping article disposed about a tool handle.
Figure 9:
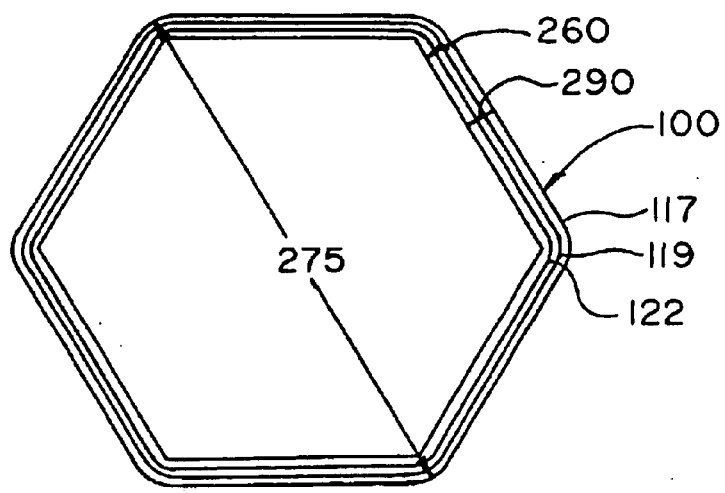
FIG. 9 is a cross-sectional view of the first embodiment of the present damping article disposed about a hexagonal tool handle.

Referring to FIGS. 8 and 9, one embodiment of the present damping article may be disposed about the periphery of a device designed to be directly gripped by a user and which transmits mechanical vibrations to the user's hands. The device may include handles of such tools as grinders, drills, fettling tools, jackhammers, riveting guns, impact hammers, chain saws, powered hammers, chisels, sanders, breakers, compactors, sharpeners, shapers, and the like or may be a vehicular or implement steering wheel. The embodiment of FIG. 8 is generally circular in cross-section and is designated generally at 250. The embodiment of FIG. 9 is generally hexagonal in cross-section and is indicated generally at 260. Obviously, other cross-sectional geometries could be present as well. The gripping diameter of article 250 is designated generally at 270 and the gripping diameter of the article 260 is designated generally at 275. It is contemplated that the present invention includes devices substantially covered by the present damping article as depicted. As indicated, the diameters of the handles 250 and 260 may be reduced such that an effective gripping diameter would result when the present damping articles are disposed thereon. The device 100 may be disposed such that the layer 122 will contact the handles 250 and 260 and such that the layer 117 will contact the user's hand. Seams 280 and 290 show where the two ends of the article 100 come into contact and may be joined.

EXAMPLE

A glove with an inserted damping article (such as depicted in FIG. 4) was tested for damping effectiveness using the protocol specified in the standard EN ISO 10819:1996 (European Committee for Standardization (CEN)), hereby incorporated by reference. The standard EN ISO 10819:1996 is entitled "Mechanical vibration and shock-Hand-arm vibration-Method for the measurement and evaluation of the vibration transmissibility of the gloves in the palm of the hand." This protocol contains a method to measure, analyze, and calculate the vibration transmissibility (TR) of gloves. The transmissibility is defined as the ratio of vibration transmitted from a handle to the palm of the hand in the frequency range 31.5 Hz to 200 Hz ($TR_M$) and the frequency range 200 Hz to 1250 Hz ($TR_H$). Transmissibilities in the above-referenced standard are determined by the ratio of accelerations measured at the surface of the hand and at the reference point in this protocol. Transmissibilities greater than 1 indicate that the glove actually amplifies the vibration. Transmissibilities lower than 1 indicate that the glove attenuates (dampens) the vibration. Mean transmissibilities for the M ($TR_M$) and H ($TR_H$) frequency ranges are determined from replicated trials. To satisfactorily pass the standards of this protocol, gloves must have a mean $TR_M$ of 1.0 or less and a mean $TR_H$ of 0.60 or less. Two glove inserts configured similarly to the embodiment depicted in FIG. 4 were tested. The glove inserts differed in overall thickness— one insert having a thickness of 0.220", and one insert having a thickness of 0.250". A mean $TR_H$ of 0.56 (STD 0.04) and a mean $TR_M$ of 0.85 (STD 0.02) were observed for the 0.022" thick insert. A mean $TR_H$ of 0.58 (STD 0.05) and a mean $TR_M$ of 0.85 (STD 0.02) were observed for the 0.250" thick insert. Thus, both embodiments received passing scores as determined by the protocol. Where an effective gripping diameter was a particular concern, the article with the 0.220" thickness would be preferable in some circumstances.

Figure 10:
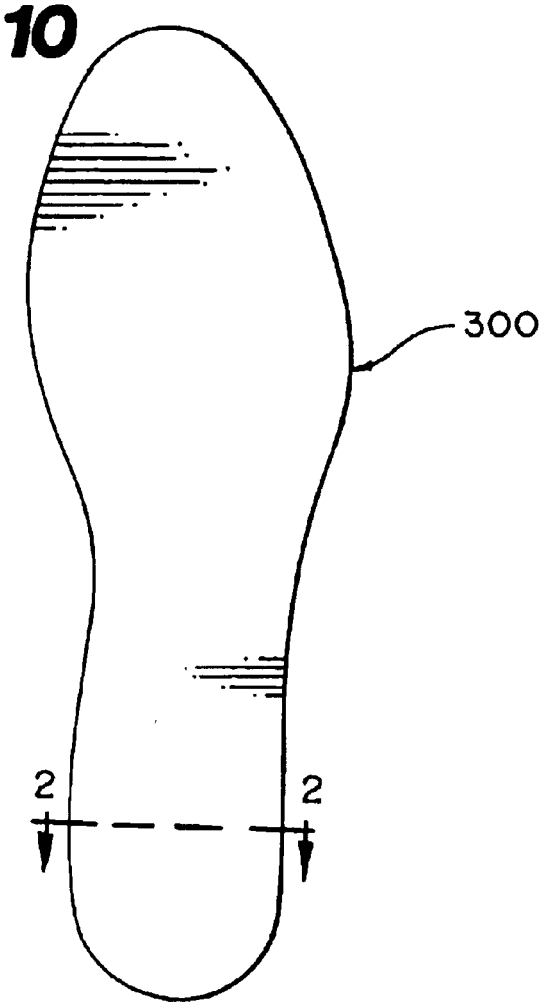
FIG. 10 is a side view of the sixth embodiment of the present damping article.
Figure 11:
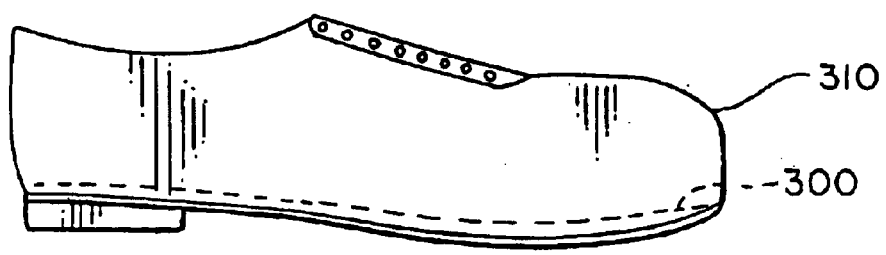
FIG. 11 is a side view of the damping article of FIG. 10 disposed in a shoe as an insert or insole.

Referring to FIG. 10, another embodiment of the present invention is depicted generally at 300. The article 300 may have a substantially identical cross-section to that described in connection with FIG. 2, above, and is configured as an insert to be worn inside shoe 310 as depicted in FIG. 11. Alternatively, the article 300 may be permanently affixed within shoe 310 as an insole, or the like. The article 300 is contemplated to be advantageously worn when a user must stand upon a vibrating surface or platform. The article 300 may also be advantageous under normal walking conditions or, especially under walking conditions such as walking or running on hard surfaces (e.g., concrete).

The present damping article may be made by pouring a non-foamed liquid polyurethane formulation as described with respect to layer 122 into a mold to a desired thickness. The liquid formulation may be allowed to cure at least partially, e.g., to a 60% cure, to form the layer 122. After the layer 122 has been formed and cured to the desired amount, a foamed liquid polyurethane formulation such as described in conjunction with the layer 119 is poured over the layer 122 to a desired thickness and allowed to cure to a desired extent, e.g., 60%, thereby forming the layer 119 bonded to the layer 122. When the layer 119 has cured to a desired extent, a liquid poly(2-chloro-1,3-butadiene) formulation described in conjunction with the layer 117 is poured thereover to a desired thickness and allowed to cure, thereby forming the layer 117 bonded to the layer 119. Alternatively, the layers may be formed separately then adhered to each other by adhesives known to the art, such as thermo-elastic adhesives. The layers 117, 119, and 122 are depicted in FIG. 2 in a substantially overlaying relation. The substantially overlaying relation is contemplated to include marginal portions in which not all layers are present. These thinner marginal portions may be desired in some embodiments in which a tapering article thickness is present.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A substantially flexible article for damping mechanical vibrations, comprising:
   a first layer comprising a first layer polymer damping mechanical vibrational frequencies between about 31.5 Hz and 200 Hz;
   a second layer comprising a second layer viscoelastic polymer with a second layer density, the second layer damping mechanical vibrational frequencies between about 200 Hz and 1250 Hz; and
   a third layer comprising a third layer viscoelastic polymer with a third layer density, the second layer density between about 90 and 95 percent of the third layer density, the third layer damping mechanical vibrational frequencies between about 31.5 Hz and 200 Hz, the first, second, and third layers disposed in a substantially overlaying relation.

2. The article of claim 1, in which the first, second, and third layers cooperate to provide a vibratory transmissibility of less than about 1.0 for mechanical vibrational frequencies between about 31.5 Hz and 200 Hz and a vibratory transmissibility of less than about 0.6 for mechanical vibrational frequencies between about 200 Hz and 1250 Hz.

3. The article of claim 2, the first layer polymer comprising poly(2-chloro-1,3-butadiene).

4. The article of claim 3, in which a compression deflection of the poly(2-chloro-1,3-butadiene) is between about 2 psi and 5 psi.

5. The article of claim 4, in which a Shore 00 durometer of the poly(2-chloro-1,3-butadiene) is between about 28 and 45.

6. The article of claim 5, in which a density of the poly(2-chloro-1,3-butadiene) is between about 8 lb/ft$^3$ and 15 lb/ft$^3$.

7. The article of claim 3, in which the poly(2-chloro-1,3-butadiene) is a neoprene foam.

8. The article of claim 3, in which the poly(2-chloro-1,3-butadiene) is a closed-cell neoprene foam.

9. The article of claim 2, in which the second and third layer viscoelastic polymers comprise respective second and third layer polyurethanes with respective second and third layer Shore 00 durometers, the second layer Shore 00 durometer less than the third layer Shore 00 durometer.

10. The article of claim 9, the first, second, and third layers displaying an article thickness such that an effective gripping diameter of a gripped member is between about 1.0 inch and 2.0 inches.

11. The article of claim 9, the first, second, and third layers displaying an article thickness such that an effective gripping diameter of a gripped member is between about 1.25 inches and 1.75 inches.

12. The article of claim 9, the first, second, and third layers displaying an article thickness such that an effective gripping diameter of a gripped member is about 1.5 inches.

13. The article of claim 9, the first, second, and third layers displaying an article thickness between about 0.2 inch and 0.275 inch.

14. The article of claim 9, the first, second, and third layers displaying an article thickness between about 0.22 inch and 0.275 inch.

15. The article of claim 9, the first, second, and third layers displaying an article thickness between about 0.22 inch and 0.25 inch.

16. The article of claim 9, the first, second, and third layers displaying an article thickness between about 0.238 inch and 0.237 inch.

17. The article of claim 9, the first, second, and third layers displaying an article thickness between about 0.238 inch and 0.25 inch.

18. The article of claim 9, the second layer displaying a second layer thickness of between about 0.060 inch and 0.066 inch.

19. The article of claim 9, the third layer displaying a third layer thickness of between about 0.05 inch and 0.59 inch.

20. The article of claim 9, the second layer with a Shore 00 hardness value between about 21 and 27.

21. The article of claim 9, the second layer with a Shore 00 hardness value between about 23 and 25.

22. The article of claim 9, the third layer with a third layer Shore 00 hardness value between about 28 and 34.

23. The article of claim 9, the third layer with a third layer Shore 00 hardness value between about 30 and 32.

24. The article of claim 9, configured as a glove insert.

25. A glove, in combination with the article of claim 24.

26. The article of claim 9, configured as a permanent glove component.

27. A glove, comprising the article of claim 26.

28. The article of claim 9, configured as a shoe insert.

29. A shoe, in combination with the article of claim 28.

30. The article of claim 9, configured as a shoe insole.

31. A shoe, in combination with the article of claim 30.

32. The article of claim 9, further comprising at least one crease corresponding to a hand flexure portion.

33. The article of claim 9, further comprising a plurality of article portions.

34. The article of claim 9, configured to be disposed between a source of mechanical vibrations and a user's anatomical portion, the mechanical vibrations selected from medium and high frequencies.

35. The article of claim 34, the user's anatomical portion selected from a hand and a foot.

36. The article of claim 34, in which the source of mechanical vibrations is a power tool.

37. The article of claim 34, in which the source of mechanical vibrations is an air-actuated power tool.

38. The article of claim 34, in which the source of mechanical vibrations is a steering wheel.

\* \* \* \* \*